United States Patent [19]

Ozawa et al.

[11] Patent Number: 5,227,896
[45] Date of Patent: Jul. 13, 1993

[54] IMAGE READER FOR PRODUCING AND SYNTHESIZING SEGMENTED IMAGE DATA

[75] Inventors: Takashi Ozawa; Mamoru Nobue, both of Kanagawa, Japan

[73] Assignee: Fuji Xerox Co., Ltd., Tokyo, Japan

[21] Appl. No.: 760,908

[22] Filed: Sep. 17, 1991

[30] Foreign Application Priority Data

Sep. 18, 1990 [JP] Japan ................................. 2-246291

[51] Int. Cl.⁵ ........................ H04N 1/393; H04N 1/04
[52] U.S. Cl. ..................................... 358/474; 358/471
[58] Field of Search ........................... 358/471–474, 358/482–483; 355/233–235; 359/197–200

[56] References Cited

U.S. PATENT DOCUMENTS

| | | | |
|---|---|---|---|
| 4,837,635 | 6/1989 | Santos | 358/474 |
| 4,918,542 | 4/1990 | Nagashima et al. | 358/474 |
| 4,980,781 | 12/1990 | Yamamoto et al. | 358/474 |
| 4,987,499 | 1/1991 | Kimura | 358/474 |

OTHER PUBLICATIONS

Radio Shack 1985 Catalog ©1984, Tandy Corp. p. 183.

Primary Examiner—Stephen Brinich
Attorney, Agent, or Firm—Finnegan, Henderson, Farabow, Garrett & Dunner

[57] ABSTRACT

An image reader including: a scanning mechanism section for holding an imaging optical unit and a solid-state image pick-up device, and for rotating the imaging optical unit and the solid-state image pick-up device in an arbitrary direction and another direction orthogonal to that arbitrary direction respectively, so that an original image can be picked up with an arbitrary resolution while being segmented into a plurality of pieces; and a control section for driving the scanning mechanism section in accordance with the original image and for synthesizing the segmented image to produce original image data. As a result of this construction, the image reader is down-sized and does not require that the original be placed on the platen glass facedown and at a predetermined position, to dispense with the conventionally required complicated operation.

4 Claims, 4 Drawing Sheets

IMAGE READER FOR PRODUCING AND SYNTHESIZING SEGMENTED IMAGE DATA

BACKGROUND OF THE INVENTION

The present invention relates to an image reader for imaging the optical image of an original image on a solid-state image pick-up device using imaging optical means and for converting such optical image into an electric signal. More particularly, the present invention is directed to a structure for down-sizing such an image reader.

Image readers which are applied to such devices as facsimile machines, digital copying machines and scanners for personal computers include a type such that an original 103 is placed on the upper surface of a frame 101 having a platen glass (not shown) on top thereof to read out images as shown in FIG. 6.

Inside the frame 101 mounted are a light source 105, mirrors 107, a lens 109 and a solid-state image pick-up device (e.g., CCD: Charge Coupled Device) 111. These components constitute a reducing optical system.

Another type of image reader includes, as shown in FIG. 7, inside a frame 101 having a platen glass (not shown), a light source 105, a rod lens array 113 and a contact type sensor 115, all constituting an equimagnifying imaging optical system.

A light beam emitted from the light source 105 is reflected on the original 103 surface and the reflected light is imaged on the solid-state image pick-up device 111 or the contact type sensor 115 through the reducing optical system or the equimagnifying imaging system, respectively. That is, the reflected light is converted into an electric signal in accordance with the light and shade of the original.

According to the aforementioned conventional constitution, a platen glass for placing the original 103 thereon is necessary, which requires the width and depth larger than those of the original 103 on the image reader. Further, the height of the image reader is also restricted by the space for accommodating the reducing optical system or the equimagnifying imaging system; e.g., a height of some 10 to 30 cm must be ensured. Therefore, there is the problem that the image reader becomes large in structure.

Being comparatively large in structure, the conventional image readers are not suitable in being installed on top of a personal desk. Thus, their down-sizing has been required strongly.

Furthermore, there is another problem that the conventional image readers require that the original 103 be placed not only facedown but also in a predetermined position, which entails cumbersome operation on the part of users.

SUMMARY OF THE INVENTION

The invention has been made in view of the above circumstances. Accordingly, an object of the invention is to provide a down-sized image reader whose operation is simple and easy.

To achieve the above object, an image reader according to the present invention comprises: imaging optical means whose magnification is variable; a solid-state image pick-up device arranged with a predetermined positional relation with respect to the imaging optical means; a scanning mechanism section for holding the imaging optical means and the solid-state image pick-up device, and for picking up an original image with an arbitrary resolution by segmenting the original image into a plurality of pieces while rotating the imaging optical means and the solid-state image pick-up device in an arbitrary direction and another direction orthogonal to the arbitrary direction respectively; and control means for driving the scanning mechanism section in accordance with the original image and for synthesizing the segmented image picked up by the scanning mechanism section to produce original image data.

Specifically, the original image is picked up with an arbitrary resolution while being segmented into a plurality of pieces so that image data in the form of the plurality of segmented pieces can be obtained. Then, the plurality of segmented pieces of image data are synthesized so that desired original image data can be produced.

BRIEF DESCRIPTION OF THE DRAWINGS

FIGS. 1 to 5 are diagrams showing an embodiment of the invention: of which

FIG. 1 is a diagram schematically showing the construction of an image reader body;

FIG. 2 is a functional block diagram;

FIG. 3 is a flow chart;

FIGS. 4 (a) and 4 (b) are diagrams illustrating the determination of the size and segmentation count of an original image;

FIGS. 5 (a) and 5 (b) are diagrams showing how the image reader is used, and

DETAILED DESCRIPTION OF THE PREFERRED EMBODIMENT

An embodiment of the invention will now be described with reference to FIGS. 1 to 5.

Figure 1:
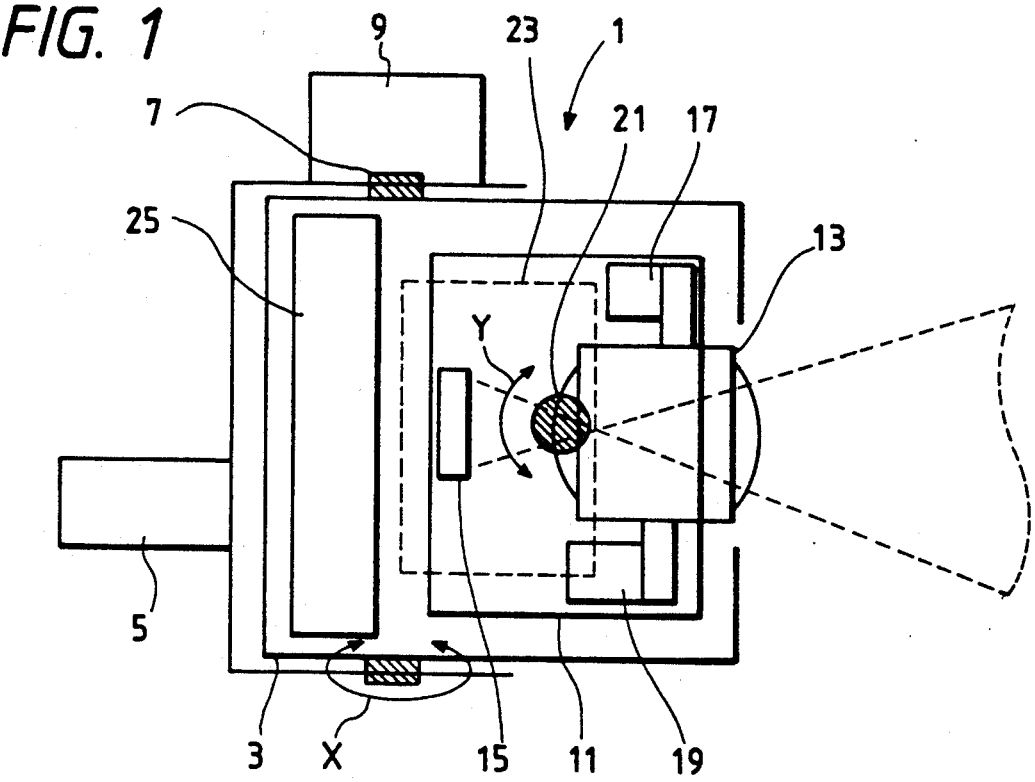

The construction of a scanning mechanism section 1 of an image reader, which is an embodiment of the invention, will be described first with reference to FIG. 1. A horizontally movable frame 3 is mounted on a support section 5, and this horizontally movable frame 3 is arranged so as to be rotatable in an X-direction (any arbitrary direction) about a horizontally scanning shaft 7. A horizontally scanning mechanism 9 is also arranged, and this mechanism 9 serves to rotate the horizontally movable frame 3.

A vertically movable frame 11 is mounted on the horizontally movable frame 3 On the vertically movable frame 11 mounted are imaging optical means 13, a solid-state image pick-up device (e.g., CCD constituting a two-dimensional image sensor) 15, an imaging magnification control mechanism 17, and a focus control mechanism 19. Also, a drive processing circuit 25 is mounted on the horizontally movable frame 3.

The vertically movable frame 11 is rotatable in a Y-direction (another direction) which is orthogonal to the X-direction about a vertical scanning shaft 21. This vertically movable frame 11 is driven by a vertically scanning mechanism 23.

Thus, the imaging optical means 13 and the solid-state image pick-up device 15 are arranged so as to be rotatable with respect to the two directions which are orthogonal to each other (constituting a gyro mechanism).

Next, the construction of control means of the image reader will be described with reference to FIG. 2 in relation to the scanning mechanism section 1.

Figure 2:
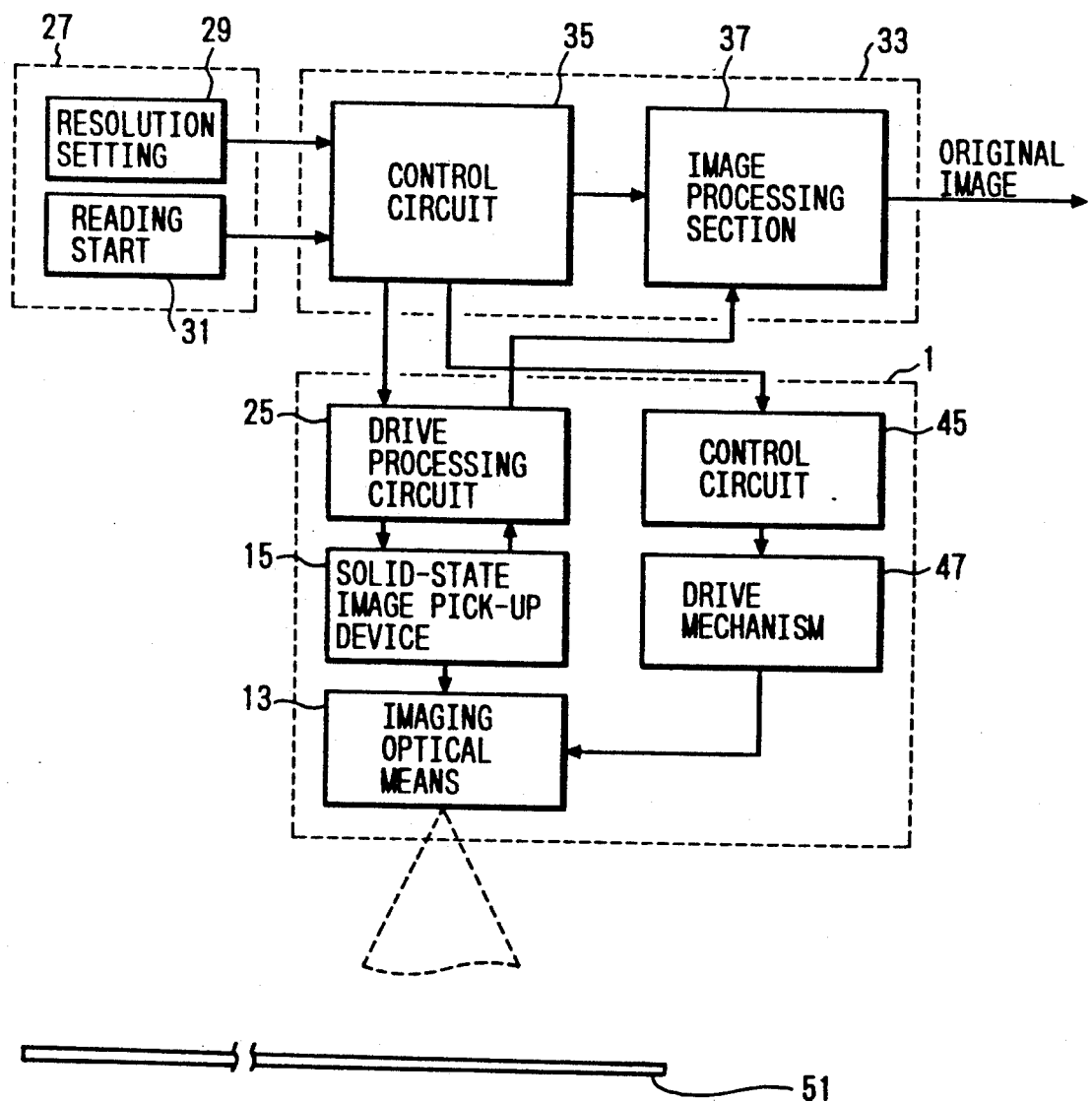

FIG. 2 is a functional block diagram. From an input section 27 a "resolution setting" operation 29 and a "reading start" operation 31 are instructed.

The above two instructions are applied to a processing section 33, which includes a control circuit 35 and an image processing section 37.

The control circuit 35 applies a control signal to the drive processing circuit 25 in accordance with the instructions from the input section 27 and operates the solid-state image pick-up device 15 at a predetermined timing.

On the other hand, from the control circuit 35 a control signal is fed to a control circuit 45 to control the drive mechanism 47 at a predetermined timing. As a result, the imaging optical means 13 is operated.

An image of an original 51 is imaged or picked up by these actions. The picked-up image data is supplied to the image processing section 37 through the drive processing circuit 25, and is subjected to a synthesis process at the image processing section 37 to obtain desired image data.

Figure 3:
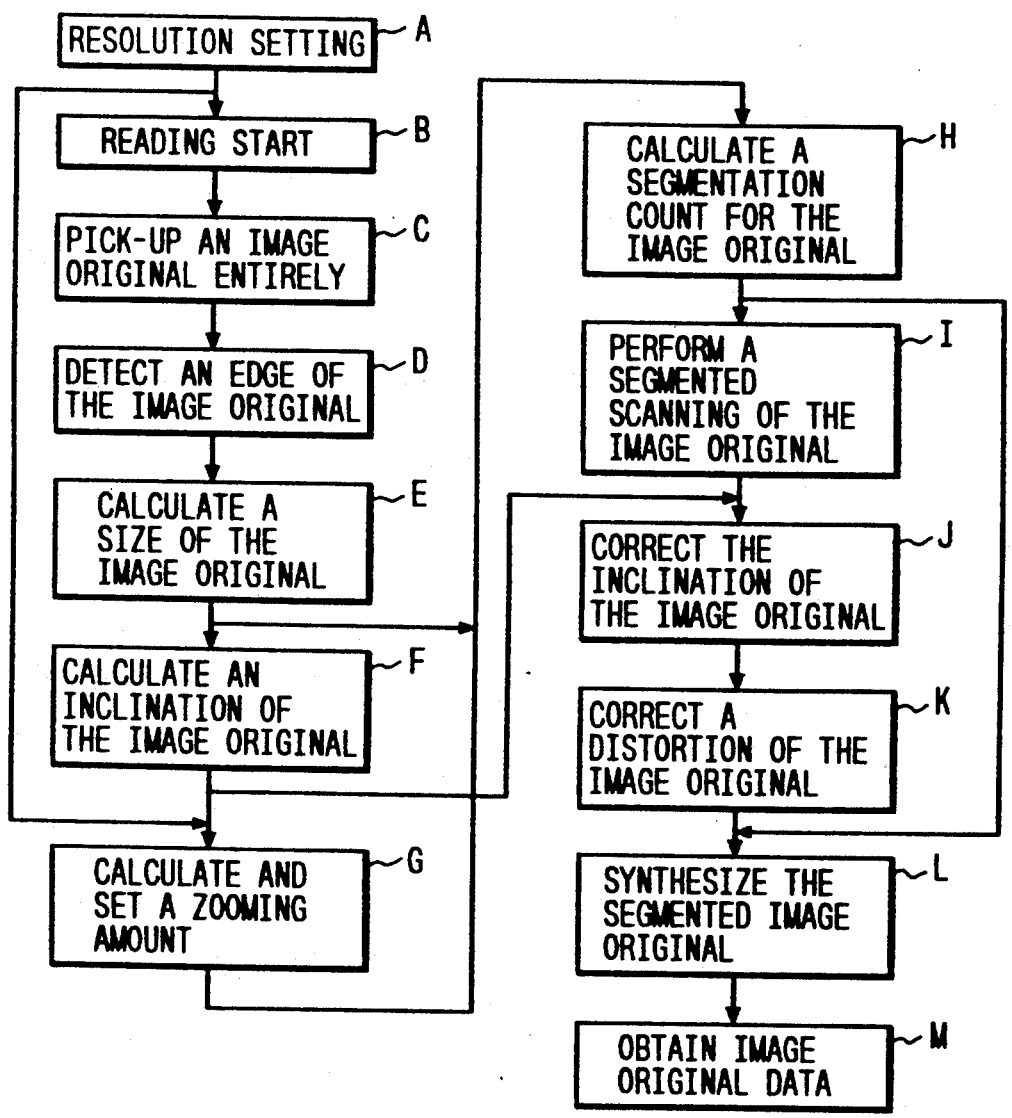

By the way, the operation of reading out the original 51 is performed in the procedure shown in FIG. 3. First, not only the "resolution setting" operation (Step A) but also the "reading start" operation (Step B) are instructed, so that an image original is picked up entirely (Step C).

An edge of the image original is detected (Step D) after the original image is picked up. This detection of the edge of the image original is performed, e.g., by detecting the difference in contrast, between the original image and the surface on which the original image is placed (e.g., the upper surface of a desk or a black sheet). Thereafter, based on distance data obtained by focusing and angle data sent from the image pick-up section, a size of the image original is calculated (Step E). Simultaneously therewith, an inclination of the image original is also calculated (Step F).

Then, a zooming amount is calculated and set (Step G), and a segmentation count for the image original is calculated (Step H). Based on the segmentation count, the scanning mechanism section 1 is driven to rotate both the imaging optical means 13 and the solid-state image pick-up device 15 in the X- and Y-directions as appropriate to perform a segmented scanning of the image original (Step I).

Since each segmented piece of the image is picked up obliquely, the inclination of the image original is corrected to the obtained data in accordance with the already obtained inclination data (Step J). Simultaneously, a distortion of the image original is corrected based on the already obtained distance data since the original image is distorted due to slight differences between focusing distances (Step K).

The thus obtained segmented image data is then subjected to a synthesis operation of the segmented image original (Step L) to thereby obtain image original data (Step M).

Now, the methods of calculating the size of the original image and the image segmentation count which have already been mentioned will be described in further detail with reference to FIGS. 4 (a) and 4 (b).

Figure 4A:
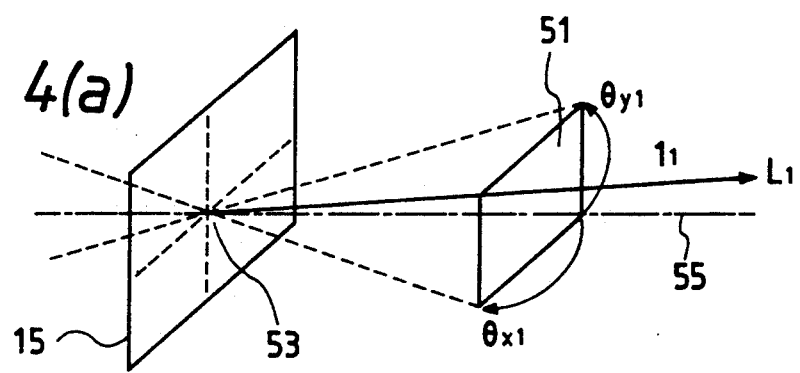
Figure 4B:
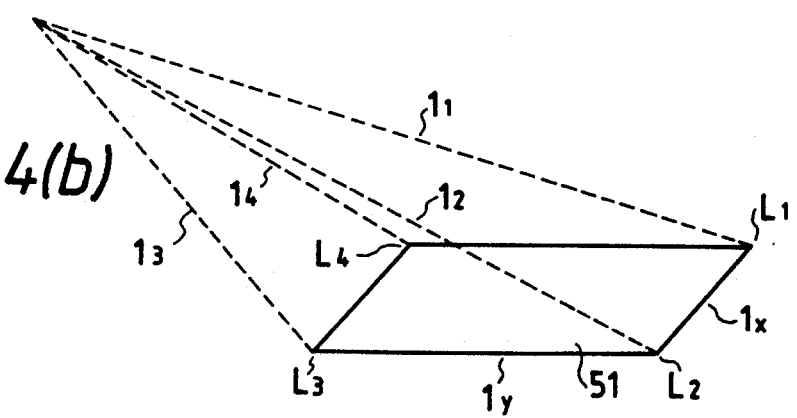

As shown in FIG. 4 (a), the solid-state image pick-up device 15 is rotated in both the X- and Y-directions appropriately so that a corner L of the original image 51 is positioned at a center 53 of the solid-state image pick-up device 15. It is assumed that angles of rotation with respect to the axis of origin 55 at this time are set to $\theta_{x1}$ and $\theta_{y1}$ respectively and that a distance by focusing is set to $l_1$.

The angles of rotation and the distances are calculated by performing similar operations to the remaining three corners $L_2$, $L_3$ and $L_4$ of the original image 51. As a result, the spatial coordinates of the four corners $L_1$, $L_2$, $L_3$ and $L_4$ of the original image 51 are obtained as follows.

$L_1:(l_1\ \theta_{x1}\ \theta_{y1})$ $L_2:(l_2\ \theta_{x2}\ \theta_{y2})$ $L_3:(l_3\ \theta_{x3}\ \theta_{y3})$ $L_4:(l_4\ \theta_{x4}\ \theta_{y4})$ Then, based on the above spatial coordinates, the lengths of the original image 51 in the X-direction (lx) and in the Y-direction (ly) are calculated. That is, the length in the X-direction (lx) and the length in the Y-direction (ly) can be expressed by the following equations (I) and (II) using a predetermined function f which has the aforementioned angles of rotation and distance as its parameters.

$$(lx) = f(l_1 l_2 \theta_{x1} \theta_{y1} \theta_{x2} \theta_{y2}) \qquad (I)$$

$$(ly) = f(l_2 l_3 \theta_{x2} \theta_{y2} \theta_{x3} \theta_{y3}) \qquad (II)$$

The size of the original image 51 is determined based on the length in the X-direction (lx) and the length in the Y-direction (ly).

The segmentation count of the original image 51 is then calculated. The segmentation counts (nx) and (ny) of the original image 51 can be obtained by the following equations (III) and (IV).

$$nx = m\ lx/Nx \qquad (III)$$

$$ny = m\ ly/Ny \qquad (IV)$$

where
m: resolution
Nx: the number of pixels of the solid-state image pick-up device 51 in the X-direction
Ny: the number of pixels of the solid-state image pick-up device 51 in the Y-direction The scanning mechanism section 1 is operated based on the above data. That is, the image is scanned separately in nx times for a scope of horizontal angles from $\theta_{x1}$ to $\theta_{x2}$ or from $\theta_{x3}$ to $\theta_{x4}$. The image is also scanned separately in ny times for a scope of vertical angles from $\theta_{y1}$ to $\theta_{y4}$ or from $\theta_{y2}$ to $\theta_{y3}$. Accordingly, the entire part of the original image 51 is picked up while segmented by a predetermined count.

Specifically, assuming that the resolution m is 16 dots/mm; the size of the original image 51 is A4; and the number of pixels of the image pick-up device 15 (Nx×Ny) is (500×500), then the segmentation count (nx, ny) becomes (7, 10), and thus, the entire part of the original image 51 is segmented into 70 pieces. Therefore, 70 pieces of segmented image data can be obtained.

Next, an explanation as to how the image reader, which is the embodiment of the invention, is practically used will be described below.

Figure 5A:
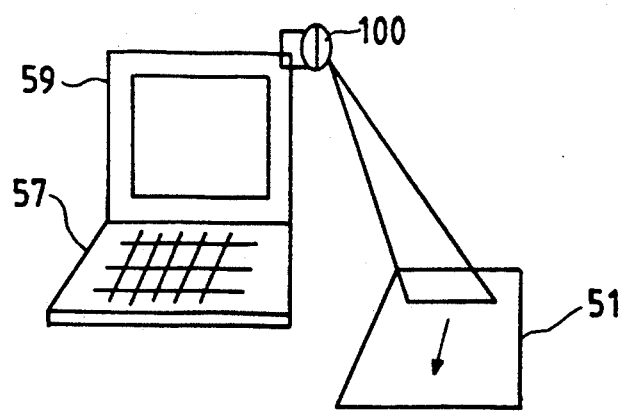
Figure 5B:
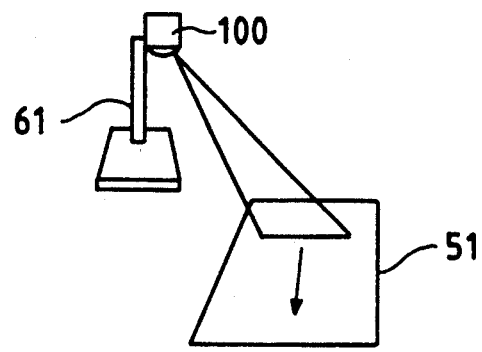
Figure 6:
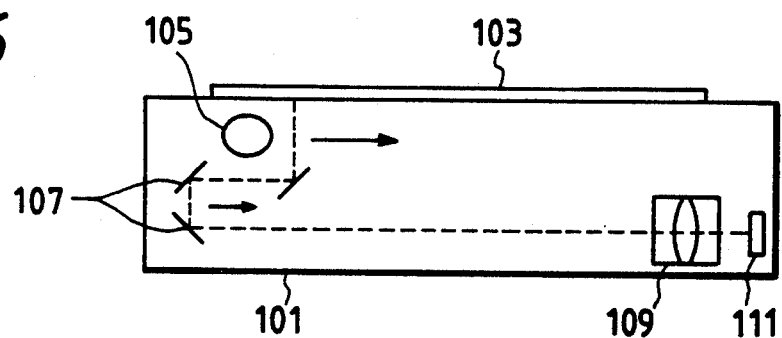
FIGS. 6 and 7 are diagrams showing the constructions of conventional image readers.
Figure 7:
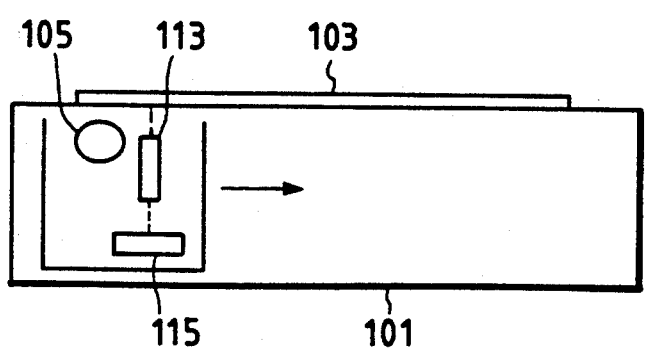

For example, as shown in FIG. 5 (a), an image reader 100 is detachably mounted on a body 59 of a display panel of a small-sized computer 57. An output terminal of this image reader 100 is connected to an input terminal of the small-sized computer 57, so that an output signal of the image reader 100 can be fed to the small-sized computer 57. Then, the original image 51 is placed beside the small-sized computer 57 and is read out in the already described procedure.

Further, as another example, the image reader 100 may be mounted on a stand 61 as shown in FIG. 5 (b).

According to this embodiment, the following advantages can be provided.

The image reader can be so down-sized as to allow itself to be placed atop of a personal desk while providing a satisfactory performance. This is possible because, unlike the conventional method of reading out the original image 51 by placing the original image on a platen glass facedown and reading it out from bottom upward, the scanning mechanism section 1 holding the imaging optical system 13 and the solid-state image pick-up device 15 is arranged so as to be rotatable in two directions which are orthogonal to each other and the original image 51 is picked up while segmented into a plurality of pieces.

The operation required for image reading is also simplified. That is, while the conventional image readers require that the original image 51 be placed not only on the platen glass facedown but also at a predetermined position, the image reader of the embodiment dispenses with any such operation.

Further, not only the reading quality can be improved, but also high-quality final image data can be produced. The reason is that the zooming technique is employed so as to allow a required resolution to be reproduced and that the obtained image data is subjected to inclination correction and focus correction.

Still further, any object can be read out; i.e., the image reader of the embodiment can be used with any material. Merely room light is enough as a light source for reading originals, thereby allowing the energy consumption to be reduced.

The invention is not limited to the aforementioned embodiment.

Although the solid-state image pick-up device 15 is assumed to be formed by the two-dimensional image sensor constituted by the CCD in the aforementioned embodiment, the device 15 may be formed by other devices such as a MOS type two-dimensional image sensor, a bipolar type two-dimensional image sensor, an amorphous silicon and TFT type two-dimensional image sensor.

It may also be conceivable to use the CCD type, the MOS type, the bipolar type, or the amorphous silicon and TFT type one-dimensional image sensor and to cause it to move and scan within the scanning mechanism section 1, or to cause the scanning mechanism section 1 itself to be moved to achieve an equivalent two-dimensional scanning operation.

Original images are not limited to the sheet-like original image 51 shown in the aforementioned embodiment, but may include books, hand-carried documents and three-dimensional materials.

It is further conceivable to arrange the image reader of the invention under the platen glass surface to constitute a conventional copying machine.

As described in the foregoing, the image reader of the invention not only arranges the imaging optical means and the solid-state image pick-up device so as to be rotatable in two arbitrary directions which are orthogonal to each other and picks up an original image by segmenting such image into a plurality of pieces, but also synthesizes the segmented pieces of image to produce the desired image data, thereby contributing to down-sizing the image reader.

What is claimed is:

1. An image reader comprising:
    imaging optical means whose magnification is variable;
    a solid-state image pick-up device arranged with a predetermined positional relation with respect to said imaging optical means;
    a scanning mechanism section for holding said imaging optical means and said solid-state image pick-up device, and for picking up an original image with an arbitrary resolution by segmenting said original image into a plurality of pieces while rotating said imaging optical means and said solid-state image pick-up device in an arbitrary direction and another direction orthogonal to said arbitrary direction respectively; and
    control means for driving said scanning mechanism section in accordance with said original image and for synthesizing said segmented image picked up by said scanning mechanism section to produce original image data.

2. The image reader of claim 1, further comprising means for outputting the original image data from the control means to a computer.

3. The image reader of claim 1, further comprising means for detachably mounting said scanning mechanism section to a body of a computer.

4. An image reader, comprising:
    a rotatable imaging optical means attached to a frame;
    a solid-state image pick-up device attached to the frame, the solid-state image pick-up device being rotatable in a direction orthogonal to the rotational direction of the imaging optical means;
    means for detecting the size of an image original by rotating the solid-state image pick-up device;
    means for producing a segmentation count for the image original based on the size of the image original;
    means for simultaneously rotating the imaging optical means and the solid-state image pick-up device to perform a segmented scanning of the image original based on the segmentation count to produce segmented image data; and
    means for synthesizing the segmented image data to obtain image original data.

* * * * *